United States Patent [19]
Banakis et al.

[11] Patent Number: 5,456,610
[45] Date of Patent: Oct. 10, 1995

[54] CONNECTOR APPARATUS EQUIPPED WITH AN EJECTOR MECHANISM FOR IC PACKS

[75] Inventors: Emanuel G. Banakis, Naperville; Kenneth F. Janota, Lisle; Brian G. Krause, Arlington Heights; Harrold K. Lang, Fox River Grove, all of Ill.

[73] Assignee: Molex Incorporated, Lisle, Ill.

[21] Appl. No.: 122,205

[22] Filed: Sep. 16, 1993

[51] Int. Cl.[6] .................................................. H01R 13/62
[52] U.S. Cl. ............................................ 439/157; 439/153
[58] Field of Search .................................. 439/152–160, 439/297, 298, 372, 350, 351; 361/399, 413

[56] References Cited

U.S. PATENT DOCUMENTS

| | | | |
|---|---|---|---|
| 4,810,200 | 3/1989 | Sakamoto | 439/155 |
| 4,952,161 | 8/1990 | Komatsu | 439/159 |
| 5,026,296 | 6/1991 | Hashiguchi | 439/159 |
| 5,033,972 | 7/1991 | Komatsu et al. | 439/153 |
| 5,139,435 | 8/1992 | Komatsu et al. | 439/159 |
| 5,149,276 | 9/1992 | Dixon | 439/159 |

FOREIGN PATENT DOCUMENTS 0534138  3/1993  European Pat. Off. ......... G06K 7/06

*Primary Examiner*—David Pirlot
*Attorney, Agent, or Firm*—Stacey E. Caldwell

[57] ABSTRACT

An improved ejector mechanism is disclosed in conjunction with a header connector into which an IC pack is loaded and from which it is ejected. The IC pack includes a shell having a vertically extending leading face and at least one row of contacts extending a horizontal distance defining a contact array. A unitary ejecting lever is pivotally mounted to the header connector, with one end of the lever being effective to engage and eject the IC pack from the header connector. A unitary push-rod is reciprocally axially movably mounted on an appropriate support at one side of the header connector. One end of the push rod is engageable with the opposite end of the ejecting lever for pivoting the lever in response to movement of the push-rod. The one end of the ejecting lever engages and ejects the IC pack along a leading face thereof in an area defined horizontally by the distance the row of contacts extends and vertically by the height of the leading face of the memory card.

12 Claims, 4 Drawing Sheets

5,456,610

CONNECTOR APPARATUS EQUIPPED WITH AN EJECTOR MECHANISM FOR IC PACKS

FIELD OF THE INVENTION

This invention generally relates to the art of electrical connectors and, particularly, to a connector apparatus having a header connector adapted for receiving a memory card or IC pack, with means for ejecting the IC pack therefrom.

BACKGROUND OF THE INVENTION

A conventional connector apparatus for an IC pack or memory card includes a generally U-shaped frame having a pair of guide grooves inside each of a pair of side frame portions, with a connector section joining or extending between the side frame portions. A planar IC pack or memory card, in a rectangular card package, is inserted into the apparatus between the side frame portions within the side guide grooves. A transverse array of socket terminals on a leading face of the IC pack electrically connect to an associated array of pin terminals on the connector section.

Such connector apparatus often are provided with header connectors used for interconnecting semi-conductor or memory chips of the IC pack to a main electronic unit of a computer, for example. The header connector is used in conjunction with the IC pack or memory card for removably coupling the IC pack to a printed circuit board in the main electronic unit. The IC pack is inserted into the header connector and is extracted therefrom as needed. The extraction force of the IC pack, i.e. the force between the respective terminal pins on the header connector and the respective socket terminals of the IC pack, is relatively high due to the tight fit required to obtain a good electrical interconnection between the terminals. These terminals typically are disposed at a high density which further increases the extraction forces. Previously, when an IC pack was to be extracted from a header connector, the card was grasped by a user and simply pulled out.

However, problems have been encountered in removing IC packs from header connectors. Specifically, when the IC pack or memory card is extracted manually, considerable force may be required to overcome the fitting friction between the terminals of the header connector and those of the IC pack. In using such force, the extracting direction often is not axial or precisely perpendicular to the terminal interface, and the terminals may be damaged. Consequently, a variety of ejecting mechanisms have been incorporated in various connector apparatus, such as the header connectors, for facilitating the ejection of an IC pack from a header connector. Some ejecting mechanisms have been incorporated as integral or unitary devices fabricated as part of the connector apparatus or header connector itself. On the other hand, separate ejecting mechanisms have been provided for assembly to the header connector, such as after the header connector has been coupled to a printed circuit board.

Since a memory card or IC pack typically in the form of a relatively thin package, with the socket terminal array extending across substantially the entire leading face of the card, there is a relatively small area along the leading face of the card from which to eject the card. Accordingly, prior art ejecting mechanisms have consisted of complex multi-piece designs including springs, cams, sliders and trays, which are not only costly to inventory and assemble, but which often require special features on the memory card or IC pack itself to provide a surface or area from which to eject the card. However, according to the standards used today in the memory card industry, such as PCMCIA (Personal Computer Memory Card International Association), IC packs and memory cards must conform to specifications which do not include such features. Therefore, ejecting mechanisms have been designed to accommodate such standard cards. Typically, these ejecting mechanisms have effected ejection of the card from a portion of the leading face outside the socket terminal array, on one or, more often, on both sides thereof. The mechanisms which push (or pull) a memory card straight away from the header connector usually require additional components, such as a tray, in order to engage both sides of the leading face of the card outside the socket terminal array and to effect a symmetrical and mechanically effective ejection. Other ejecting mechanisms, such as the design disclosed in pending U.S. patent application Ser. No. 08/082,652 and assigned to applicants' assignee, have been designed to eliminate the tray. However, these mechanisms have ejected the memory card from one outside corner of the leading face of the memory card and therefore provide an asymmetrical ejection which may, in some circumstances, provide relatively less leverage and a greater likelihood of damaging terminals as compared to ejecting mechanisms which utilize a generally symmetrical ejection.

This invention is directed to providing a low profile, simplified and mechanically effective ejecting mechanism for an IC pack or memory card, which ejects the card along the leading face thereof inside an area defined by the socket terminal array and without the use of extraneous components typical of the prior art.

SUMMARY OF THE INVENTION

An object, therefore, of the invention is to provide a new and improved ejector system for use with a connector apparatus for IC packs or memory cards.

In the exemplary embodiment of the invention, the ejector system includes a header connector into which an IC pack is inserted and from which it is ejected. The header connector includes a U-shaped housing with a plurality of pin terminals mounted in the bight portion thereof and having terminal mating portions which form a terminal array. The IC pack is a rectangular portable card of known configuration and includes a shell within which is mounted a circuit substrate with electronic components such as integrated circuits, memory chips or the like. Electrical contacts are coupled to the circuit substrate and communicate with a leading face of the memory card shell, forming a transverse contact array adapted to mate with the terminal array of the header connector. The header connector includes opposing side walls with a centerline therebetween generally coincident with a centerline of the IC pack and extending in the direction of insertion of the IC pack into the header connector. A unitary ejecting lever is pivotally mounted on the header connector, with a first end adapted to eject the IC pack from the header connector. An elongated push-rod is reciprocally mounted on one side of the header connector, with one end of the push-rod engageable with a second end of the ejecting lever for pivoting the lever in response to actuation of the push-rod.

The invention contemplates that the first or ejecting end of the ejecting lever engage and eject the IC pack generally along the leading face thereof inside an area defined in the transverse or horizontal direction by the memory card contact array, and in the vertical direction by the height of the leading face. Complementary interengaging pivot means are provided between the ejecting lever and the header connector and are located between the ejecting end of the ejecting lever and one of the opposing side walls of the header connector. As disclosed herein, the interengaging pivot means are located intermediate opposite ends of the ejecting lever.

The preferred embodiment of the connector apparatus includes the header connector, the ejecting lever, the push-rod, and a stamped and formed guide frame member for guiding the memory card between an inserted position and an ejected position. The ejecting end of the eject lever is adapted to engage the leading face of the memory card approximately along the centerline and below the contact array.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
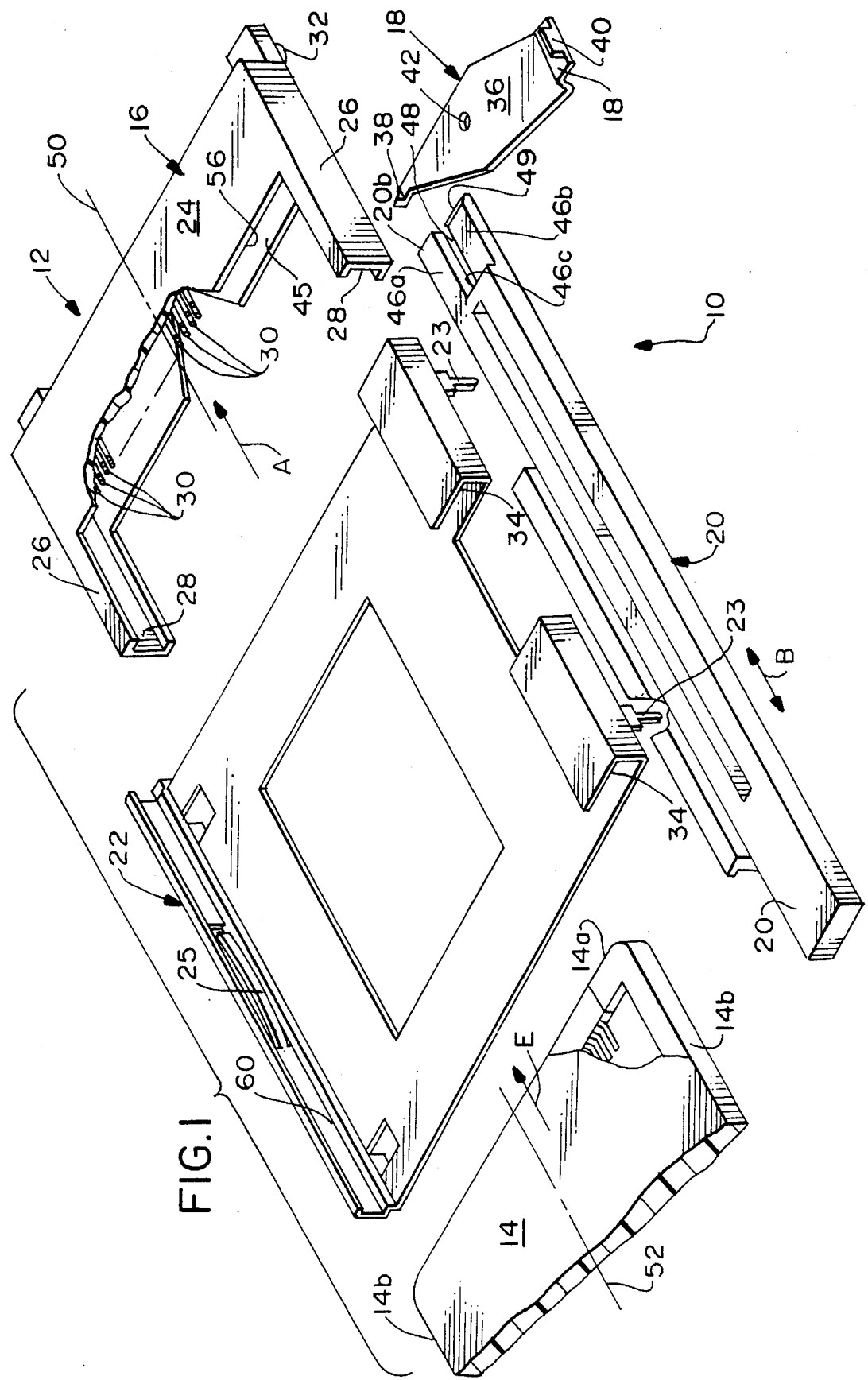
FIG. 1 is an exploded perspective view of a connector apparatus incorporating the ejector system of the invention.

Referring to the drawings in greater detail, and first to FIG. 1, the ejector system of the invention is embodied generally in a three-part ejector mechanism, generally designated 10. The mechanism is designed for incorporation directly in a connector apparatus which includes a header connector, generally designated 12, into which a memory card or IC pack 14 is inserted and from which it is ejected.

Generally, ejector mechanism 10 includes: a first part in the form of a housing, generally designated 16, of header connector 12; a second part in the form of a one-piece ejecting lever, generally designated 18; and a third part in the form of a one-piece actuating push-rod, generally designated 20. In the preferred embodiment of the invention illustrated herein, a fourth part in the form of a guide frame, generally designated 22, is employed to facilitate guiding the insertion and extraction of memory card 14 and reciprocal movement of push-rod 20. The guide frame may include a plurality of mounting pegs 23 for insertion into appropriate holes in a substrate such as a printed circuit board and a grounding tab 25 for grounding the memory card to an underlying apparatus. However, it should be understood that guide frame 22, or some means to afford its functions, may be incorporated directly into header connector 12. For example, guide frame 22 may extend in toward the header connector to form the floor of housing 16 or a portion thereof. In the preferred embodiment, header connector housing 16 and push-rod 20 are individually and integrally molded of dielectric material such as plastic or the like. Lever 18 and guide frame 22 may be molded of similar material, or stamped and formed of conductive sheet metal. Other than the components enumerated above, no other extraneous components are required to assemble or to operate the ejector mechanism.

Figure 2:
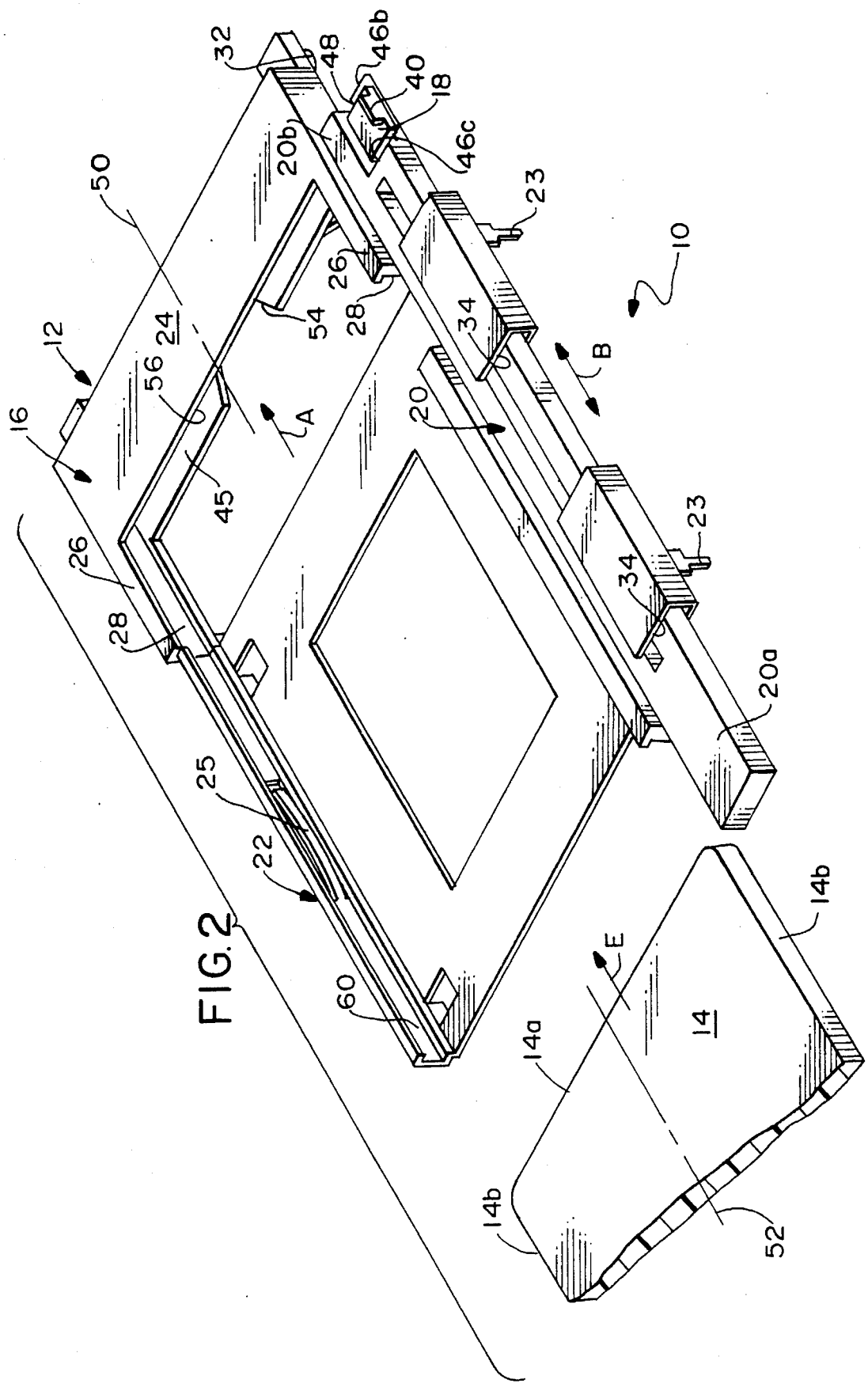
FIG. 2 is a perspective view of the connector apparatus in assembled condition.

More particularly, and further describing the preferred embodiment shown in FIGS. 1 and 2, header connector housing 16 is unitarily molded of plastic material and includes an elongated body portion 24 and two side wall portions 26 whereby the housing is generally U-shaped, as seen most clearly in FIGS. 1–4. Side wall portions 26 include inwardly directed channels 28 into which memory card 14 is inserted in the direction of arrow "A". Elongated body portion 24 is adapted for mounting a plurality of electrical terminals 30 in the form of pins having tail portions 31 (FIGS. 3 and 6) for coupling, as by soldering, to appropriate circuit traces on a printed circuit board 29 (FIG. 6), by surface mounting or by soldering the tail portions within terminal-receiving holes. The terminals 30 have terminal mating portions disposed in two rows defining a terminal array (FIG. 5B) projecting from the side of body portion 24 opposite from the tail portions. The terminal mating portions of the pins are adapted to interconnect with corresponding contacts on memory card 14 when the card is properly inserted into header connector 12. The contacts on the card typically are in the form of receptacle terminals 25 disposed in two rows defining a contact array in a leading face 14a of the card. Lastly, housing 16 includes a pair of mounting pegs 32 for insertion into appropriate mounting holes in the printed circuit board.

Actuating push-rod 20 includes a push button 20a at one end thereof and a drive end, generally designated 20b, at the opposite end thereof. The drive end forms part of a complementary interengaging drive means between the push-rod and ejecting lever 18, as will be seen below. The push-rod is positioned within channels 34 formed integrally with and projecting outwardly from one side of guide frame 22. As seen in FIGS. 1 and 2, a first side channel 33 may be integrally formed on an inside, or card facing side, of actuating push-rod 20. Push button 20a of the push-rod is exposed at the front of the guide frame, as seen in FIG. 2, and the drive end 20b of the push-rod projects out of the rear-most channel 34 for complementary interengagement with ejecting lever 18. Consequently, the push-rod is reciprocally mounted for movement in the direction of double-headed arrow "B" (FIGS. 1 and 2). The push-rod is manually manipulatable by a user pushing on push button 20a in the direction of arrow "C" (FIG. 2).

Figure 3:
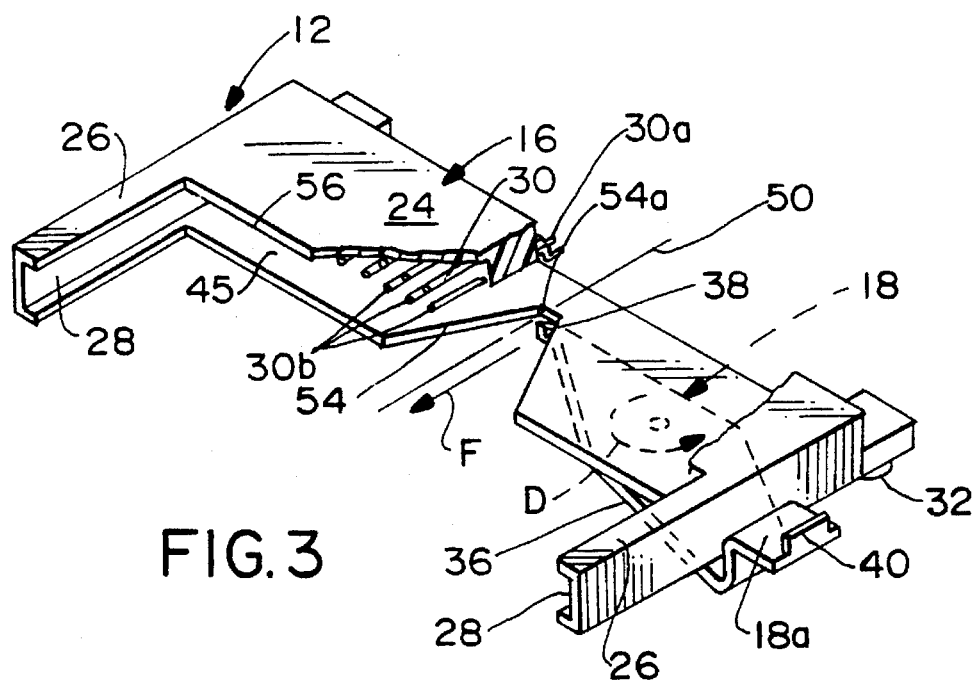
FIG. 3 is a fragmented top perspective view of the header connector and ejecting lever.
Figure 4:
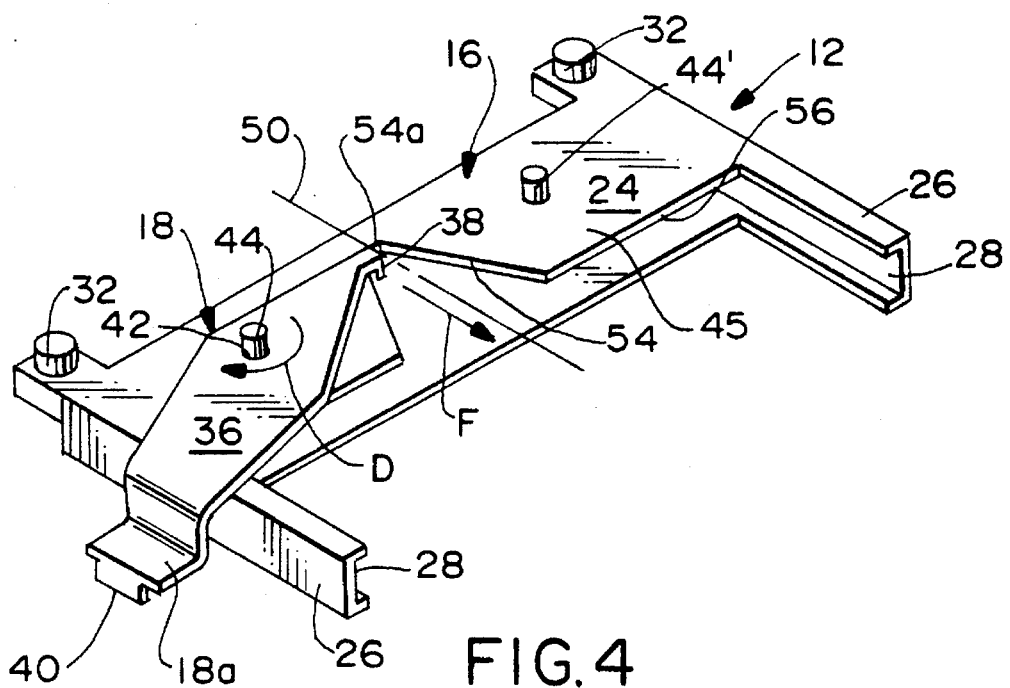
FIG. 4 is a bottom perspective view of the header connector housing and the ejecting lever.

Referring to FIGS. 3 and 4 in conjunction with FIGS. 1 and 2, ejecting lever 18 is elongated and includes a lever arm 36 having an ejecting tab 38 at one end and an offset drive tab 40 at the opposite end. The drive tab cooperates with drive end 20b of push rod 20, as described hereinafter. A pivot hole 42 is formed in arm 36 of ejecting lever 18 between its ends, i.e. between ejecting tab 38 and drive tab 40. Pivot hole 42 embraces a pivot boss 44 on the underside or bottom wall 45 of housing 16 of header connector 12 whereby the ejecting lever is rotatable about the boss in the direction of arrow "D". In essence, pivot hole 42 and pivot boss 44 define complementary interengaging pivot means between the ejecting lever and the header connector. Lastly, it also can be seen in FIG. 4 that a second pivot boss 44' projects from the bottom wall of the header connector housing on an opposite side thereof. This additional pivot boss is provided so that the header connector can be used with ejecting lever 18 and push-rod 20 at the opposite side of the header connector.

Referring back to FIGS. 1 and 2, complementary interengaging drive means are provided between ejecting lever 18 and push-rod 20 for effecting actuation or pivoting of the lever in response to actuating or manually pushing on push button 20a of the push-rod in the direction of arrow "C" (FIG. 2). More particularly, drive end 20b of the push-rod is bifurcated to define a pair of axially extending arms 46a and 46b which, in turn, define a slot 48 therebetween. Drive tab 40 of ejecting lever 18 projects into slot 48, such that the drive tab engages a shoulder 46c when the push-rod is pushed in the direction of arrow "C". Arms 46a and 46b are in different planes, and drive tab 40 projects from an offset lip 18a of the ejecting lever. In this manner, arm 46a overlies the top of lever arm 36, whereas arm 46b extends below lip 18a, with drive tab 40 projecting into slot 48 between the arms. Lastly, arm 46b has a transverse flange 49 which will engage lip 18a to hold the push-rod in assembled condition, i.e. against removal of the push-rod from channels 34 opposite the direction of arrow "C".

Figure 5A:
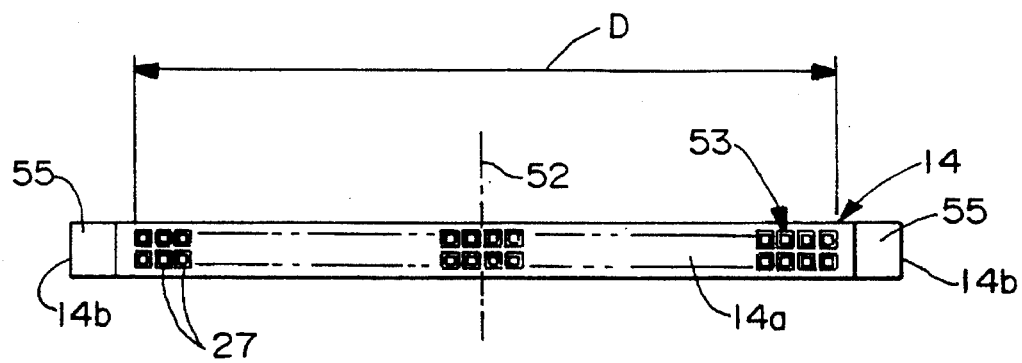
FIG. 5, is a front mating view of the card contact array on the memory card leading face (5A) and of the terminal array of the electrical connector (5B)
Figure 5B:
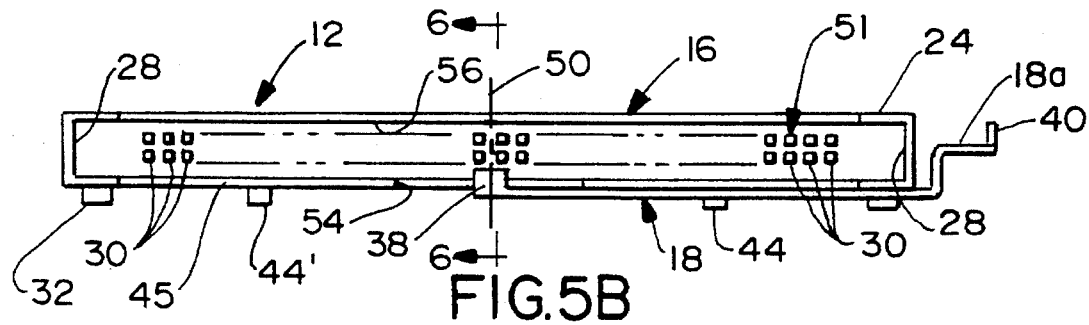

Before proceeding with the operation of the ejector system of the invention, it should be understood, as shown in FIG. 5, that header connector 12 includes a plurality of pin terminals 30 mounted in body portion 24 of housing 16 to form a terminal array 51 (FIG. 5B) defined by rows of terminals extending in a transverse direction within the body portion of the housing, i.e. perpendicular to the direction of insertion of the memory card. The terminal array is adapted to mate with a corresponding contact array 53 (FIG. 5A) on the leading face 14a of the memory card 14. The header connector is further defined by a centerline 50 extending approximately midway between its opposing side walls, i.e. intersecting the midpoint of terminal array 51. Similarly, memory card or IC pack 14 includes a centerline 52 which is equidistant between its sides 14b and which intersects contact array 53 in the center thereof. Upon insertion of the memory card into the header connector, centerlines 50 and 52 preferably are coincident.

Figure 6:
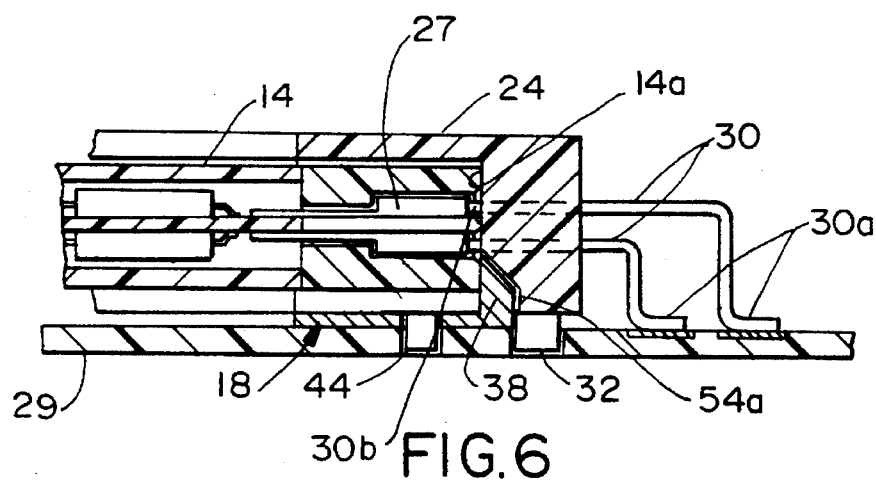
FIG. 6 is a cross-sectional view of the electrical connector taken generally along line 6—6 in FIG. 5B, but with a memory card electrically coupled thereto.

Referring now to FIGS. 3 and 4, bottom wall 45 of elongated body portion 24 of header connector housing 16 has a triangular-shaped cutout 54 into which ejecting tab 38 of ejecting lever 18 projects. An apex 54a (FIG. 3) of the cutout may be located anywhere along the bottom wall 45, but in the preferred embodiment, it is positioned approximately along centerline 50 of the header connector. Ejecting tab 38 projects into an elongated receptacle 56 of body portion 24 into which edge 14a of memory card 14 is received. Therefore, when an IC pack or memory card is electrically coupled to the header connector, upon actuation of the actuating rod, ejecting tab 38 engages a portion of the leading face 14a of the memory card inside an area defined horizontally by the outermost contacts of the contact array 53 and defined vertically by the height of the leading face 14a. This is seen most clearly in FIG. 5A and 5B wherein the ejecting tab 38 engages the leading face 14a of the memory card at an area along the leading face within area D (FIG. 5A). In prior art memory card ejecting mechanisms, the eject lever or tray engages the leading face outside this area, typically on one or both of the outer corners 55 of the leading face. In the preferred embodiment of the invention, upon actuation of the actuator arm, the ejecting tab 38 engages the leading face 14a of the memory card approximately along the centerline 52 thereof below the contact array 53, as shown in FIG. 6. This provides for a relatively uniform and mechanically effective ejection of the memory card from the header connector and minimizes costs associated with extraneous components such as trays.

In operation of the ejector system of the invention in conjunction with the connector apparatus shown in the drawings, memory card or IC pack 14 is inserted between a pair of side channels 60 and 33 of guide frame 22 and push-rod 20 respectively, in the direction of arrow "E" (FIGS. 1 and 2). The memory card is inserted in the direction of arrow "A" and enters channels 28 of side wall portions 26 of header connector housing 16 until the leading face 14a of the memory card enters receptacle 56 of the header connector and the receptacle contacts 25 of contact array 53 are electrically coupled to the header pins 30 of terminal array 51. If ejecting lever 18 and push-rod 20 were not already in ejecting condition, leading face 14a of the memory card will engage ejecting tab 38 of ejecting lever 18 and cause the lever to pivot and move push-rod 20 opposite the insertion direction to the ejecting condition shown in FIG. 2.

When it is desirous to eject memory card 14 from header connector 12, a user pushes on push button 20a of push-rod 20 in the direction of arrow "C" (FIG. 2). The push-rod, in turn, rotates ejecting lever 18 in the direction of arrow "D" (FIGS. 3 and 4) which causes ejecting tab 38 of the ejecting lever to move in the direction of arrows "F" to engage a portion of leading face 14a of memory card 14 and eject the memory card at least to the extent of disengaging receptacle terminals 25 from terminal pins 30, whereupon the memory card can be easily removed manually.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In an eject mechanism for ejecting a generally rectangular memory card from a connector assembly, said memory card including:

a leading face extending a given vertical distance in a first direction; and a plurality of card contacts communicating with the leading face and arranged in a contact array having at least one row extending a given horizontal distance in a second direction, said row defined by a first end contact located at a first end of the row, and a second end contact located at an opposite end of the row;

said connector assembly including:

a housing for receiving the memory card; and a plurality of terminals mounted in the housing and arranged in a terminal array adapted to mechanically and electrically engage the contact array of the memory card, the terminal array having at least one row defined by a first end terminal adapted to engage the first end contact of the memory card contact array and a second end terminal adapted to engage the second end contact of the contact array;

said eject mechanism being operatively associated with the housing and including:

an elongated actuator mounted on one side of the housing; and an eject member coupled to one end of the actuator and including a projection adapted to eject the memory card from the connector assembly;

wherein the improvement comprises:

the projection of the eject member engages the leading face of the memory card on a portion thereof inside an area defined horizontally by the horizontal distance the row of the contact array extends, and vertically by the vertical distance the leading face extends.

2. The eject mechanism as set forth in claim 1 wherein the eject member comprises a one-piece unitarily stamped & formed member.

3. The eject mechanism as set forth in claim 1 wherein the eject member comprises a one-piece unitarily molded member.

4. The eject mechanism as set forth in claim 1 wherein the projection of the eject member is adapted to engage the leading face of the memory card below the contact array of card contacts.

5. The eject mechanism as set forth in claim 4 wherein the connector assembly is further defined by a connector centerline extending along a center of the connector housing and including a point along the terminal array located approximately midway between the first end terminal and the second end terminal, said connector centerline configured to be generally coincident with a card centerline extending along a longitudinal axis of the memory card and including a point along the contact array located approximately midway between the first end contact and the second end contact, wherein the projection of the eject member is positioned approximately along the connector centerline and is adapted to engage the leading face of the memory card approximately along the centerline thereof.

6. The eject mechanism as set forth in claim 1 wherein the housing of the connector assembly further comprises a bottom wall including means for guiding the projection of the eject member into engagement with the leading face of the memory card.

7. The eject mechanism as set forth in claim 6 wherein the means for guiding the projection of the eject member comprises a generally triangular-shaped cutout formed in the bottom wall of the housing.

8. The eject mechanism as set forth in claim 1 wherein the eject member is pivotally mounted to the connector assembly by way of complementary interengaging pivot means between the housing and the eject member.

9. The eject mechanism as set forth in claim 8 wherein the complementary interengaging pivot means comprises a pivot boss integrally formed on the bottom wall of the housing and a complementary pivot recess formed on the eject member intermediate opposite ends thereof.

10. An eject mechanism for ejecting a generally rectangular memory card from a connector assembly in an ejecting direction, said memory card including a leading end with card contacts mounted therein, the leading end having a leading face extending a vertical distance in a direction perpendicular to said ejecting direction, said card contacts arranged in at least one row including a first end contact located at a first end of the row, and a second end contact located at the opposite end of the row, said at least one row defining a contact array extending a horizontal distance in a direction perpendicular to both the ejecting direction and the vertical direction, said connector assembly including a housing for receiving the memory card, a plurality of terminals arranged in a terminal array within the housing and adapted to mechanically and electrically engage the card contacts of the memory card, and guide means for guiding the memory card between an inserted position wherein the card contacts of the memory card are electrically connected to the terminals of the connector assembly and an ejected position spaced from the inserted position, the eject mechanism being operatively associated with the housing and comprising:

a manually manipulatable elongated actuator positioned on one side of the housing; and an eject lever pivotally connected to one end of the actuator and including a projection adapted to engage the memory card and to move the memory card to its ejected position, wherein the projection engages the leading face of the memory card on a portion thereof inside an area defined horizontally by the horizontal distance which the contact array extends, and vertically by the vertical distance which the leading face extends.

11. In a connector apparatus for mechanically and electrically connecting a memory card to an underlying electrical device, the memory card including a shell with a leading end within which is mounted a plurality of receptacle contacts, and the connector apparatus including:

an electrical connector having a housing with a plurality of pin contacts mounted therein adapted to electrically engage the receptacle contacts of the memory card, the housing including a bottom wall having a board-mounting face adapted to be mounted on a printed circuit board of the underlying electrical device, guide means extending from the connector housing adapted to guide the memory card into engagement with the electrical connector, and having a channel integrally formed therein, and an ejector mechanism for ejecting the memory card from the connector, the ejector mechanism including an eject lever pivotally mounted to an integral with the connector housing, and an elongated actuator arm reciprocally mounted within the channel of the guide means coupled to one end of the eject lever and having a pushbutton at one end for manual actuation thereof to effect the pivoting of the eject lever, the improvement in the connector apparatus comprising:

an integrally formed pivot boss on the board-mounting face of the bottom wall of the connector housing;

a complementary pivot recess integrally formed 6n the eject lever for mounting to the pivot boss of the housing;

aperture means located in the bottom wall of the housing for guiding a portion of the eject lever into engagement with the leading end of the memory card; and an ejecting projection formed on one end of the eject lever for engaging a portion of the leading end of the memory card shell to effect ejection thereof, whereby upon manual actuation of the actuator arm, the eject lever pivots about the pivot boss of the connector housing and the ejecting projection is guided along the aperture means to eject the memory card from the connector.

12. The connector apparatus as set forth in claim 11, the memory card further defined by a centerline extending along a longitudinal axis of the memory card shell, wherein, upon actuation of the actuator arm, the ejecting projection engages the memory card shell approximately along its centerline.

* * * * *